United States Patent

Grabl

[15] 3,648,950

[45] Mar. 14, 1972

[54] TAPE TRANSPORT WITH OVERSPEED LIMIT SERVO CONTROL

[72] Inventor: Sebastian Eric Grabl, Thousand Oaks, Calif.

[73] Assignee: Burroughs Corporation, Detroit, Mich.

[22] Filed: Sept. 8, 1970

[21] Appl. No.: 70,408

[52] U.S. Cl. ................................242/185, 242/75.51, 318/6

[51] Int. Cl. ................G11b 15/06, G11b 15/58, G11b 23/12

[58] Field of Search .............242/183, 184, 185, 75.5, 75.51; 318/6, 7

[56] References Cited

UNITED STATES PATENTS

| | | | |
|---|---|---|---|
| 3,343,052 | 9/1967 | Youngstrom | 318/6 |
| 3,345,008 | 10/1967 | Jacoby | 242/184 |
| 3,454,960 | 7/1969 | Lohrenz | 242/184 |

*Primary Examiner*—Leonard D. Christian
*Attorney*—Christie, Parker & Hale

[57] ABSTRACT

In a magnetic tape transport wherein tape is driven past an electromagnetic read or write head and onto a take-up reel through a vacuum column, a method and apparatus is disclosed for limiting overspeeding of the tape at the reel relative to the tape speed past the head by limiting the torque applied to the reel by the motor. The rotational speed of the reel is metered and a first signal indicative thereof is provided. The vacuum column is divided into regions of pre-assigned lengths with a second signal being provided which changes in amount each time the tape loop passes between a pair of adjacent regions. The motor is disabled from applying torque to the reel in each region whenever the first and second signal provided in any particular region reach a predetermined relationship.

16 Claims, 5 Drawing Figures

INVENTOR.
SEBASTIAN ERIC GRABL

BY
Christie, Parker, & Hale
ATTORNEYS

TAPE TRANSPORT WITH OVERSPEED LIMIT SERVO CONTROL

BACKGROUND OF THE INVENTION

1. Field of the Invention

This invention relates to magnetic tape transports and, more specifically to a reel servo having an overspeed limiting control system.

2. Description of the Prior Art

In magnetic tape transports, it is often necessary to buffer tape between an operational zone, including one or more electromagnetic read or write heads, and the tape reels. Buffering is especially required when separate drives are used to drive the tape past the heads and to drive the reels. Since the tape reels are burdened with a relatively high moment of inertia, they cannot accelerate or decelerate as quickly as can the tape in the operational zone. One way of decoupling the reels from the operational zone is by means of vacuum columns which draw the tape therein as a loop.

In the past, a capstan drive has been used to drive the tape in the region of the operational zone. Such drives are highly efficient when digital data is or is to be recorded on the tape because of their ability to quickly start and stop the tape. What the capstan drive actually effectuates, in driving tape past the operational zone, is the transfer of tape between vacuum columns. For instance, if the capstan starts driving the tape in a forward direction, the amount of tape in the vacuum column associated with the takeup reel will increase, whereas it will decrease in the vacuum column associated with the supply reel.

Tape loop sensors may be positioned in each vacuum column for detecting the length of tape loop in each column. For example, the sensors may detect a change in pressure (either atmospheric or vacuum) at particular points along the length of the column brought about by a change in position of the tape loop in the column. Thus, if the tape is forwardly driven, the loop in the column associated with the takeup reel increases in length. Once the loop passes a sensor previously situated below the loop, the sensor detects a change in pressure from vacuum to atmospheric and provides a signal indicative thereof. A servo control circuit is responsive to the signal for initiating the takeup reel drive to accelerate the reel in order to decrease the length of tape in the vacuum column associated with the driven reel.

One of the ways of judging the quality of a reel servo drive is to determine the operational margin of safety against "tape stack cinching." A reel of tape consists of many individual tape layers in direct contact with adjacent layers. A factor which keeps the layers in place is the coefficient of friction which exists between them. In the case of polyester backing material, an ultra-smooth coating surface, this surface friction is quite low. Thus, under a sudden change of torque, one tape layer will physically slide over the next layer. As the tape layers slide over each other, the lower strands will buckle or even fold over to equalize the pressure. "Cinching" is the result of this interlayer slippage.

The chance for tape cinching to occur depends mainly upon the torque applied to the reel. Additionally, however, it also depends upon the conditions of speed and tension under which the tape stack to which torque is applied was wound, and upon the history of manufacture and usage of the tape reel in question. If a reel containing a tape stack is accelerated by applying torque and it has been wound loosely, only a small amount of torque is required to cause tape cinching. A tape stack wound at a fairly constant speed and under proper tension on a mechanically well aligned tape mechanism, however, is highly cinch-resistant and will not break down under normal levels of reel acceleration torque.

Since there is a clear and major relationship between applied acceleration torque and the occurrence of cinching, it is desirable to be able to limit the amount of applied torque. More specifically, it is desirable to keep the amount of torque applied to the reels at the minimum possible value still consistent with the reel acceleration requirements. In the design of a high-speed tape transport, relatively high torque is necessary to satisfy the reel acceleration requirements, i.e., to insure that the tape loop remains within the bounds of each of the pair of vacuum buffers. Guarding against tape cinching is, therefore, a critical consideration. A balance must be struck between supplying sufficient torque to keep the tape loops within the columns and yet avoid substantial further increased torque in order to reduce the risk of tape stack cinching. This balance is hereinafter referred to as "overspeed limiting."

It has heretofore been proposed to use a tape-driven tachometer to meter the speed of the tape as it is wound on or off a tape reel. The tachometer generates a signal representative of the tape speed at the reel. A servocontrol receives this signal and the signals generated by the tape loop sensors in the vacuum columns and, responsive thereto, controls the torque supplied to the reel by controlling an input parameter to whatever torque-generating device is employed. For instance, the servo-control has been used to control the current supplied to a current-controlled DC motor, the motor's output torque being proportional to the input current. In this manner, torque is limited while maintaining proper acceleration requirements to maintain a tape loop in the columns.

The above system has a serious drawback. Slippage between the tape and the tachometer roller may cause severe tape failure. The tachometer roller necessarily has some small inertia and is driven by the tape coming from the reel or from the vacuum column. When the roller is accelerated, it either adds to or subtracts from the tape tension reaching the tape stack resulting in possible slippage or at least unsteady tape tension.

If the tachometer is driven by the reel shaft, the above difficulty is avoided. However, the signal indication by the tachometer is no longer proportional to the tape speed at the reel. Thus, overspeed limiting cannot accurately be controlled. However, by combining the tachometer signal indication of reel speed with knowledge of the diameter of the tape stack, it is possible to achieve effective overspeed limiting.

Two prior art methods for determining the tape stack diameter used either an optical beam with a photoelectric strip or a tension arm arrangement to sense the diameter of the tape stack. Such sensing apparatus, however, adds to the cost of the overall system and does not provide good system reliability. Furthermore, the parts are subject to wear and frequent replacement. It is desirable, therefore, to eliminate the need for optical beam or tension arm sensors and yet continue to use a tachometer driven directly from the reel rather than by the tape.

SUMMARY OF THE INVENTION

This invention achieves overspeed limiting by limiting the applied torque to the reels. A tachometer is used to provide a signal indicative of the angular velocity of the reel. Unlike prior art reel-driven tachometer systems, however, it is not necessary, in accordance with the teachings of the present invention, to directly sense the reel stack diameter and, responsive thereto, to alter the angular velocity signal indication to arrive at an indication of the linear tape speed at the reel. In accordance with the present invention, instead of sensing stack diameter, changes in loop length are used to compensate for changes in the servo operation due to the effect of stack diameter.

Generally speaking, and in accordance with the present invention, the angular velocity of a reel is metered and a first signal indicative thereof is provided. The vacuum column associated with the reel is divided into regions of pre-assigned lengths by sensors which detect the passage of the tape loop between adjacent regions. A reference signal having different reference values is established by the sensors, the value depending on the region in which the loop is positioned. The first and second signals are compared and the applied torque to the reel is cut off in each region whenever the first and second signals reach a predetermined relationship.

Thus, in accordance with the present invention the applied torque to the reel is cut off in each region that the tape loop enters whenever the angular velocity of the reel reaches a predetermined relationship with the reference signal pre-assigned to each region. Torque is thereby controlled dependent on loop position, avoiding the use of a tape-driven tachometer or means to directly measure stack diameter.

In a specific embodiment, the apparatus according to the present invention comprises a plurality of loop position sensors spacially disposed throughout each vacuum column and defining a plurality of regions therebetween. Means are coupled to the loop position sensors for establishing a reference signal corresponding to a particular damping speed for each region into which the loop moves. This is accomplished by providing a reference signal which changes by a pre-assigned value each time the tape passes one of the sensors. A reel-driven tachometer generates a second signal indicative of the rotational speed of the reel. Means add the first and second signals together and generate a third signal indicative of their sum. Amplifier means respond to the third signal for generating a reel drive motor control signal. Clamp means are coupled to the amplifier means for limiting the maximum positive and negative values of the control signal thereby limiting the maximum positive and negative reel-driving torque.

A method according to the present invention comprises the steps of metering the rotational speed of the reel and providing a first signal indicative thereof; dividing the vacuum column into regions of pre-assigned lengths; providing a second signal which changes to a different pre-assigned value each time the tape loop passes between a pair of adjacent regions; and disabling the motor from applying torque to the reel in each region whenever the first and second signals provided for each particular region reach a predetermined relationship.

BRIEF DESCRIPTION OF THE DRAWING

These and other aspects and advantages of the present invention are more clearly described below with reference to the accompanying drawing in which.

DESCRIPTION OF THE ILLUSTRATED EMBODIMENTS

Figure 1:
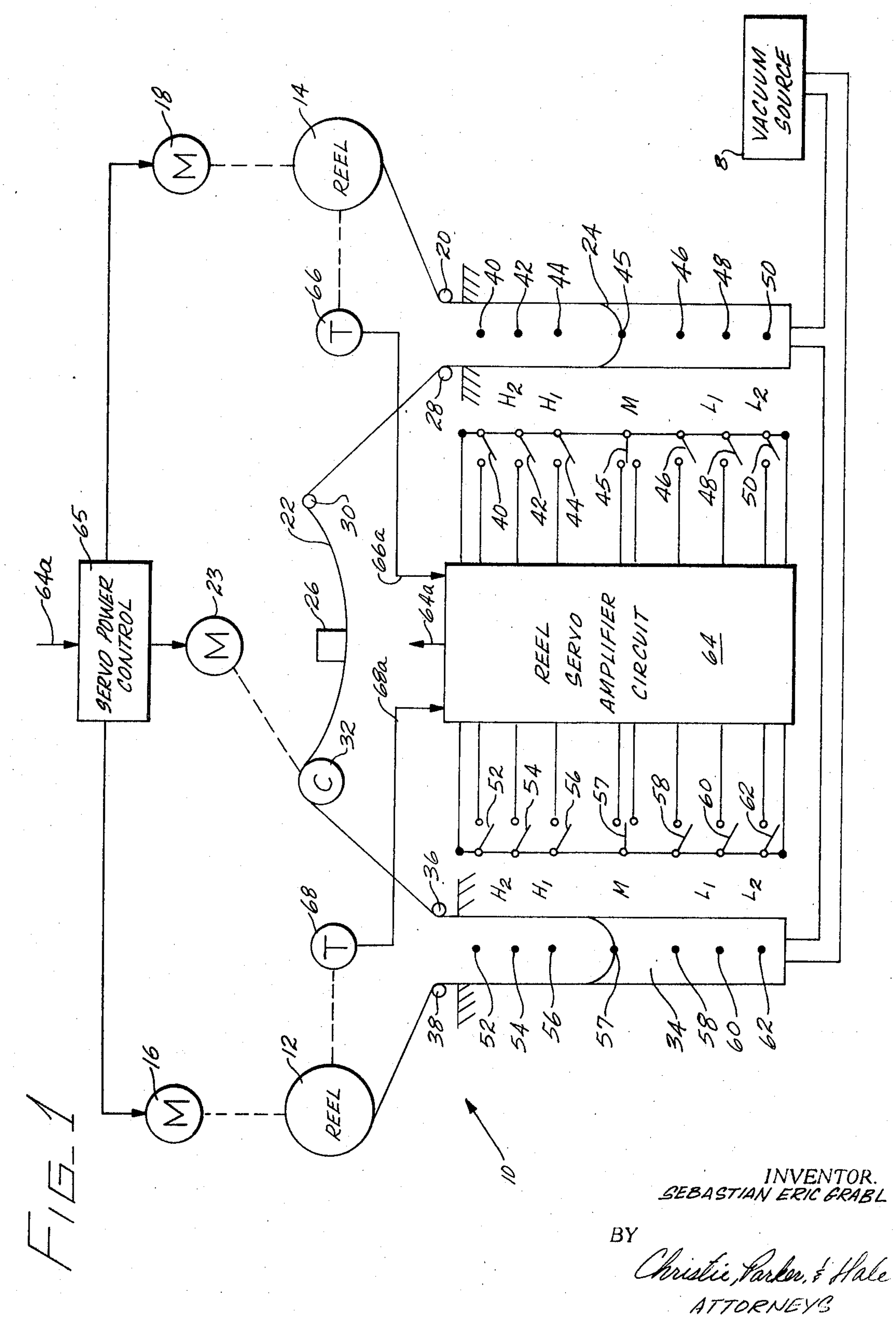
FIG. 1 is a schematic diagram of a tape transport including the overspeed limit servo control system of the present invention.

An overspeed limited tape transport 10 having five control regions in the vacuum column is shown generally in FIG. 1. A pair of tape reels 12 and 14 are respectively driven by a pair of reversible DC motors 16 and 18. A tape path is established between the reels by a guide member 20 feeding a magnetic tape 22 from reel 14 into a vacuum buffer column 24. A vacuum source connected to the bottom of column 24 draws tape 22 therein in loop form. The tape is guided from column 24 to an operational zone containing a head assembly 26 (including one or more electromagnetic read or write heads) by means of a pair of guide members 28 and 30.

A single capstan 32 (preferably pneumatic) drives tape 22 between column 24 and another vacuum column 34 and thus past head assembly 26 where the heads therein read or write information from or onto tape 22. A motor 23 is operatively coupled to capstan 32 for effectuating the tape drive. Column 34 is identical in function and purpose to that of column 24, thereby establishing a tape loop therein. The tape path is completed by a guide 36 guiding the tape from capstan 32 into column 34 and a guide 38 guiding the tape from column 34 onto reel 12.

Each of vacuum columns 24 and 34 is divided into five regions (H2, H1, M, L1, and L2). In column 24, region H2 is defined between a pair of loop sensors 40 and 42, region H1 is defined between sensor 42 and a sensor 44, region M is defined between sensor 44 and another loop position sensor 46, region L1 is defined between sensor 46 and a sensor 48, and region L2 is defined between a sensor 48 and another sensor 50. Similarly, six other loop position sensors 52, 54, 56, 58, 60 and 62 define regions H2, H1, M, L1, and L2 in vacuum column 34.

A seventh sensor is included in each of vacuum columns 24 and 34, labeled 45 and 57 respectively. Sensors 45 and 57 are located in the center of the mid-regions M. They are functionally of no consequence for the actual overspeed limiting servo control operation, but are used in conjunction with an accessory control mechanism (not shown) for achieving return of the tape loop in each region to sensors 45 and 57, respectively, when the tape drive is not active. Such mechanisms are well known in the tape transport art.

Each loop position sensor is pressure sensitive for responding to a change in pressure. For instance, sensor 40 is column 24 detects atmospheric pressure since the loop is positioned below it, whereas sensor 46 detects the vacuum established by column 24 since the loop is positioned above it. Each sensor is actually a pressure-sensitive switch. Thus, sensors 40, 42, and 44 in column 24 and sensors 52, 54 and 56 in column 34 are each designed to close when they detect vacuum pressure by the associated tape loop passing upwardly past them; sensors 46, 48 and 50 in column 24 and sensors 58, 60 and 62 in column 34 close when they detect atmospheric pressures occasioned by the loop passing downwardly therepast. Bistable switches are shown as representing, diagrammatically, the loop sensors. These switches have the same numerical reference designations as the loop sensors shown in the columns.

A reel servo amplifier circuit 64 is coupled to each of the sensors and their illustrated switches. Servo amplifier 64 generates control signals representing the states of the loop sensor switches. These control signals are supplied along a line 64*a* to a servo power control circuit 65. Circuit 64 also receives signals along lines 66*a* and 68*a* from a pair of reel-driven tachometers 36 and 24, respectively. Tachometers 66 and 68 are respectively coupled to the shafts of reels 14 and 12, respectively. In other words, each tachometer meters the rotational speed of the associated reel, or the reel angular velocity.

In a manner described below in much greater detail, servo power control 65 is responsive to the signals received from servo amplifier 64 for limiting the torque applied by motors 16 and 18 to reels 12 and 14, respectively. Torque limiting is accomplished in each vacuum region without the need for extraneous devices for directly measuring stack diameter so that the tachometer outputs may be converted from indications of angular reel velocity to indications of linear tape velocity. In the system of FIG. 1, as more clearly described below with regard to FIG. 2, there is no need to directly sense stack diameter since torque is limited by a procedure involving only the sensing of the angular reel velocity.

Figure 2:
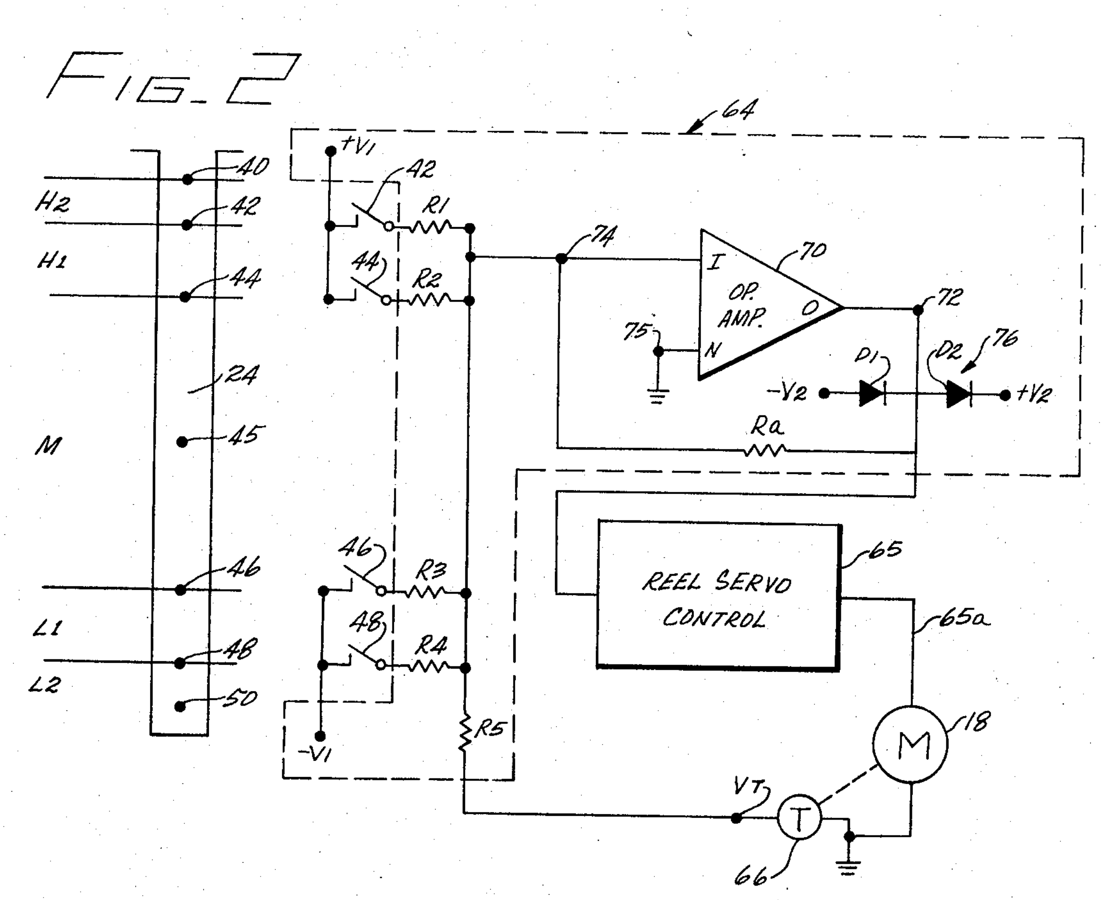
FIG. 2 is a schematic diagram of the servo control system shown in FIG. 1.

The overspeed limiting, five-region, servo control system, according to the present invention, is shown in greater detail in FIG. 2. The system is described with regard to forward tape driving by capstan 32 in a direction causing column 24 to fill and column 34 to empty. Such is by way of example only. In addition, the system is described with specific regard to the operation of column 24 and its associated loop sensors with servo amplifier 64 and servo power control 65. This also is merely by way of example, it being noted that the same procedure and effects are true when driving the tape in the reverse direction.

As has been indicated before, prior art overspeed limit systems, using reel-driven tachometers producing an angular tape velocity indication, found it essential to physically or optically sense the reel stack diameter in a direct manner and to use such information to convert angular to linear tape velocity. Thus, the tape velocity at the reel could be limited relative to the tape speed at the heads. An important feature of the present invention is the elimination of the need to convert angular to linear tape velocity indications by directly sensing stack diameter. According to the present invention, angular velocity indications per se are used.

In the above regard, a different constant reel damping speed is selected and assigned to each vacuum region. Reel damping speed is defined as a preselected rotational speed of the reel at which the applied torque thereto is to be cut off in the region assigned such damping speed. The purpose is to cut off applied torque in each region so as to effect an overall overspeed limiting which still is consistent with the reel acceleration requirements. The manner of selecting and using reel damping speeds and their relationship with the tachometer output signal, is explained below.

As a starting point for determining what damping speeds to assign to each region in column 24, the rotational speed of reel 14 is measured when the tape on a full reel, accelerated from an at rest position, reaches a linear speed equal to the tape speed past the operational zone. The rotational speed, or angular velocity, of the reel at such tape speed equilibrium, as measured by tachometer 66 in RPM's, for example, is used as a reference and is hereinafter designated RPM-0. The rotational speed of the reel is then measured at the point when the tape on an empty reel, accelerated from an at rest position, reaches a speed equal to the tape speed past the operational zone. This value of the reel RPM is compared with RPM-0 and, from a knowledge of the appropriate mathematical relationships, a formula is derived for expressing the reel RPM at selected stack diameters. The relationship between reel speed (or damping speed) and stack diameter can be expressed as follows:

$$Dia = (Ts/Ds) \cdot K$$

Where the Diameter is in inches, $Ts$ is the tape speed past the heads in inches/sec., $Ds$ is the reel damping speed in units/sec., and $K$ is a constant.

Then a specific constant reel "damping speed" is assigned to each region in column 24 at a value expressed in a fixed normalized value of RPM-0. For instance, in the preferred embodiment, if the tape stack diameter of the full reel is twice the tape stack diameter of the nearly empty reel, then regions L1 and H1 are assigned the damping speeds 1.1 RPM-0, and regions L2 and H2 are assigned the damping speeds 2.1 RPM-0. Since the relationship between stack diameter and damping speed is known, and since the stack diameter is essentially full at RPM-0, it is known that a stack diameter of 0.9 full reel exists at 1.1 RPM-0 and a stack diameter of 0.48 full reel would exist at 2.1 RPM-0 for obtaining a stationary loop position. Exactly what this means can be understood by examining the schematic diagram of FIG. 2 and the graphical plots shown in FIG. 3.

Referring first to FIG. 2, amplifier circuitry 60 includes a source of positive voltage, +V1, coupled to the closed terminals of switches 42 and 44, and a source of negative voltage, −V1, coupled to the closed terminals of switches 46 and 48. In a five-region vacuum column, such as is shown in FIGS. 1 and 2, and with the selection of an appropriate column length as hereinafter discussed, the loop position never goes below sensor 50 in normal forward drive operation of above sensor 40 in normal reverse drive operation. Thus, only sensors 42, 44, 46 and 48 are of consequence from the standpoint of the control, by servo 65, of motor 18. Sensors 40 and 50 are used as fail-safe detectors for causing system shutdown when the loop passes them since such is not to occur in normal operation and could lead to severe tape damage. As indicated before, midsensor 45 is used in the relocating of the loop when the tape is not being driven.

Amplifier circuitry 64 also includes a conventional operational amplifier 70 having an output terminal 72 fed back to an inverting input terminal 74 through a feed back resistor Ra. A noninverting input terminal 75 is grounded. Input terminal 74 is, in turn, coupled to one end of each of resistors R1, R2, R3, R4, and R5. The other ends of resistors R1, R2, R3, and R4 are respectively coupled to one terminal of sensor switches 42, 44, 46, and 48. The closed state terminals of switches 42 and 44 are, in turn, coupled to +V1; whereas the closed state terminals of switches 46 and 48 are coupled to −V1. The other end of resistor R5 is coupled to ground through tachometer 66.

Output terminal 72 of amplifier 70 is coupled to servo power control 65 through a diode clamping circuit or clamp 76. Clamp 76 includes a diode D1 having its cathode coupled to output 72 and its anode coupled to a source of negative bias voltage, −V2; and a diode D2 having its anode coupled to output 72 and its cathode coupled to a source of positive bias voltage, +V2. Clamp 76 is conventional and establishes a minimum negative and positive signal applied to servo 65 so that the maximum torque applied by motor 18 to reel 14 never exceeds a preselected amount. The precise operation of clamp 76 is more fully described below with reference to the overall operation of the servo control of FIG. 2.

Returning to resistors R1–R5, it is to be noted that they play a major role, together with voltages +V2 and Vt, in defining the damping speeds to be assigned for each region in the vacuum column. In order to understand this, it is necessary to explain the overall operation of the circuit of FIG. 2. In this regard, assume that the system is in an at rest position with the tape loop at midsensor 45. As the capstan (not shown) starts driving the tape, the tape loop begins to move downwardly through region M in vacuum column 24. In this initial phase of operation, all of the vacuum switches are open and the tachometer is not yet operating. Thus, a zero input signal is present at inverting input 74 of amplifier 70. As soon as the tape loop passes sensor 46 and into region L1, sensor 46 detects a change from vacuum to atmospheric pressure thereby closing its illustrated switch 46. This provides a circuit path from −V1 through resistor R3 to input 74 of amplifier 70. The current supplied at input 74, therefore, is −V1/R3. It is to be noted that no current is established by tachometer 66 since the reel is not yet rotating.

Responsive to the −V1/R3 current at its input 74, amplifier 70 provides an inverted amplified signal indication thereof at its output 72 which is clamped at a value slightly more positive than +V2, as determined by the voltage drop across diode D2. The clamped signal level, established at output 72 by clamp 76, responsive to the closing of switch 46, is supplied at the input of reel servo power control 65. Servo 65 responds by supplying current to motor 18 along a line 65a, the amount of current being proportional to the input voltage. Motor 18 is current controlled and applies a positive torque to reel 14. It can be said, therefore, that clamp 76 effectively establishes a maximum value of torque applied by motor 18.

The torque applied to reel 14 causes it to accelerate thereby decreasing the rate at which the loop is descending through region L1. As the reel begins to rotate, so does tachometer 66 coupled to its shaft. Thus, tachometer 66 supplies an increasing output voltage at terminal Vt which is manifest as a positive current of +Vt/R5 at input 74 of amplifier 70.

When the absolute value of Vt/R5 equals the absolute value of V1/R3, the current at the input to amplifier 70 will be zero since Vt/R5 is positive and V1/R3 is negative. Thus, no signal will be supplied at amplifier output 72 and to reel servo power control 65. In this state, motor 18 is cut off thus cutting off the applied torque to the takeup reel. At this cutoff point, the rotational speed of the reel, as measured by Vt/R5, is at the preselected assigned value for region L1, i.e., a damping speed of 1.1 RPM-0 as referenced by V1/R5 (RPM-0 being defined above as the rotational speed of the reel at the point where the tape speed thereon equals the tape speed past the heads, and where the reel had a full tape stack when initially accelerated).

In further operation, the tape speed at the reel at the torque cutoff point for region L1 may still be less than the tape speed past the heads. If this is the case, the tape loop in the column continues to drift downwardly into region L2 rather that return to region M. If the tape loop does not return to region M by re-passing sensor 46, but rather passes sensor 48 and enters region 62, it is known that the stack diameter was less than 0.9 full reel. On the other hand, if the loop returned immediately to region M, it is known that the stack diameter was greater than 0.9 full reel. In this sense, it can be stated that an indirect indication of the stack diameter on reel 14 is provided by examining the operative states of the loop position sensors. Thus, it can further be stated that the loop position sensors not only directly sense tape loop position within the column, but may additionally be used to indirectly sense discrete values of the reel stack diameter, if such were desired. As must be clearly pointed out again, however, it is not necessary, according to the present invention to physically sense stack diameter so as to convert the angular reel velocity indication from the tachometer to linear tape velocity at the reel. Overspeed, torque limiting is accomplished by comparing actual angular velocities with the reference damping speeds for each region. Responsive to a match in each region, torque is cut off.

Continuing with the operation of the circuit of FIG. 2, assume that the linear tape speed at the reel is still less than that past the heads at the torque cutoff point on region L1, the reason being attributed to a stack diameter of less than 0.9 full reel. With this the case, the loop drifts down into region L2 by passing loop sensor 48. As sensor 48 is passed, it detects atmospheric pressure and closes its illustrated switch 48, thereby providing a current of −V1 (R3·R4/(R3+R4) to input 74 of amplifier 70. Since motor 18 is cut off at the time the loop passes sensor 48, operational amplifier 76 produces a maximum clamped signal to servo control 65 thereby enabling the motor to supply maximum torque to reel 14.

The motor is again disabled, thereby cutting off the applied torque to the reel, when the absolute value of V1 (R3·R4/(R3 +R4) = Vt/R5. This occurs in region L2 when the rotational speed of the reel is at the preselected damping speed, i.e., 2.1 RPM-0 in the embodiment of FIG. 2 as referenced by V1(R3·R4)/(R+R4). At this point, the tape speed at the reel is just nominally greater that the tape speed at the heads and thus the loop begins to move upwardly back through region L2 into region L1 where, if the stack diameter is less than 0.9 full reel, the loop will oscillate about sensor 48. On the other hand, if the stack diameter is greater than 0.9 full reel, the loop will return to region M and then oscillate about sensor 46. It can be said, therefore, in either of the above cases, that the reel acceleration requirements have been met with nominal tape overspeeding at the reel. Thus, the effects of tape stack cinching are substantially reduced without the necessity of directly sensing reel stack diameter or linear tape velocity.

As further exemplary of the operation of the system of FIG. 2, consider when the capstan is driving the tape in reverse, i.e., column 24 is being emptied. The initial tape acceleration causes the tape loop in column 24 to move upwardly since the takeup reel in not yet being driven in reverse. When the loop passes sensor 44, the latter detects a change from atmospheric to vacuum pressure thereby closing its illustrated switch 44. A circuit path is thus established from +V1 to amplifier input 74 through resistor R2. Since motor 18 is not yet operating, no voltage is manifest at Vt and thus the value of Vt/R5 is zero. A total positive current of +V1/R2 is thereby supplied at input 74 of amplifier 70.

A negative output from amplifier 70 is fed to servo control 65 through clamp 76 which establishes a maximum negative signal for application to servo 65. In other words, the voltage at output 72 is never more negative that −V2 than by an amount equaling the voltage drop across diode D1. The signal at output 72 enables motor 18 to apply maximum reverse torque to reel 14 thereby driving it in reverse. As reel 14 is accelerated, the signal level of Vt becomes increasingly more negative as tachometer 66 meters the shaft speed of reel 14. When the absolute value of V1/R2 = the absolute value of Vt/R5, zero current is manifest at input 74 since they cancel. At this point, motor 18 is cut off, as is its applied torque. This point corresponds to the reel speed reaching the damping speed of 1.1 RPM-0 region H1.

Since the tape speed at the reel, at a damping speed of 1.1 RPM-0, may still be less than the tape speed past the heads, the tape loop may continue to climb upwardly into region H2. Assuming this to be the case, which would occur if the stack diameter is less than 0.9 full reel, when the loop passes sensor 42, switch 42 is closed thereby providing a current of +(R1·R2)/(R1+R2) to input 74 of amplifier 70. Servo 65 is thereby enabled, by the output of amplifier 70 as clamped through clamp 76, to re-enable motor 18 and thus the negative torque applied to the takeup reel. The torque remains applied until [+V1(Rbq.R2)/(R1+R2) − Vt/R5] = o, i.e., until the reel speed reaches the preassigned damping speed for region H2. At this point, the tape speed at the reel is nominally greater than the tape speed past the heads. Thus, the loop begins to descend downwardly back into region H, where it will oscillate back and forth about sensor 42 if the stack diameter is less than 0.9 full reel. If the diameter is greater that 0.9 full reel, however, the loop will initially return to region M and thereafter oscillate about sensor 44. In other words, the reel acceleration requirements have been met with nominal tape overspeed at the reel.

Figure 3:
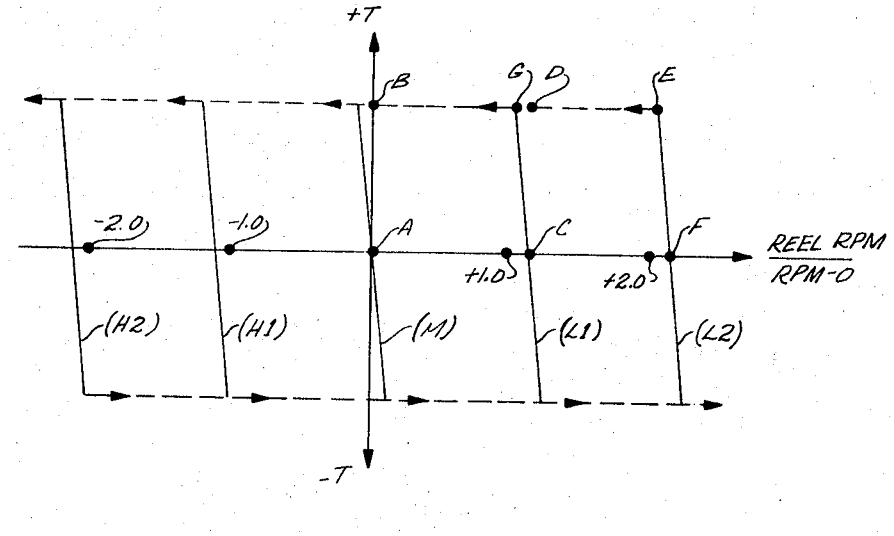
FIG. 3 is a graphical representation of the torque vs. reel speed characteristics for the reels as used with the servo control system of FIGS. 1 and 2.

The operation of the servocontrol circuitry of FIG. 2 can be more easily visualized with reference to the graphs of FIG. 3 wherein driving torque (T) is plotted as a function of the ratio of the rotational speed of the reel in RPM's to RPM-0 (above defined). There are actually five such graphical plots labeled L2, L1, M, H1, and H2. Each graphical plot is true only when the tape loop is in the region corresponding to the label on the plot. Thus, graphical plot M is true only when the tape loop is in region M in column 24.

Assume that the system is at rest with the tape loop at sensor 45 in column 24. As capstan 32 starts driving the tape forwardly past head assembly 26, it has been seen that the position of the tape loop moves downwardly through column 24. Until the loop reaches sensor 46, no torque is applied to the takeup reel and thus the tachometer output, measuring the reel RPM's, is zero. Thus, until sensor 46 is passed, the value of torque and reel (RPM/RPM-0) are both at zero as is shown by point A on the graph.

Once the tape loop passes sensor 46, it is in region L1. Therefore, plot M is no longer valid, whereas plot L1 is. As soon as sensor 46 is passed, servo control 65 causes motor 18 to apply maximum positive torque to reel 14. This instant in time is shown on the graph at point B. As the tape loop continues to move down through region L1, maximum torque is continuously applied as the reel is accelerated. Thus, the ratio of reel RPM/RPM-0 increases. As has been already discussed, a reel damping speed of 1.1 RPM-0 is assigned to region L1. Thus, when the reel reaches 1.1 RPM-0, motor 54 is disabled thereby cutting off the torque applied to the reel. This point in time is shown at point C on the graph. It should be noted that torque cutoff is not a step function as is torque turn-on. Thus, when the reel RPM is at RPM-0, as shown by point G on the graph, the torque starts to decrease linearly with increasing reel RPM until the reel RPM equals 1.1 RPM-0, at which point (C on graph) the torque is cut off.

As has already been discussed, once the reel speed has reached 1.1 RPM-0, the loop may still continue to travel downwardly through region L1 if the linear tape speed at the reel is still less that the tape speed past the heads. Thus, the loop eventually passes sensor 48 thereby making plot L2 valid. At this point, maximum positive torque is once again applied to the reel, as shown by point D on the graph. As in region L1, maximum torque is continuously applied until at point E, on the graph, at 2.0 RPM-0, 2.1 RPM-0 being the damping speed of region L2. Further increase in RPM past point E causes a linear decrease in torque until 2.1 RPM-0 is reached at point F. At this point, the torque is again cut off.

In the design of column 24, coupled with damping speed selection, point F on plot L2 occurs at a tape speed at the reel nominally greater that the tape speed past the heads. Thus, the loop commences a return upward movement through the column until either re-entrance into region L1 followed by oscillation about sensor 48, or re-entrance all the way back into region M followed by oscillation about sensor 46. As has been pointed out above, the stack diameter, as far as whether it is less or greater that 0.9 full reel, determines how far back the loop will travel and which sensor it will oscillate about. In either of the above two situations, the tape loop is maintained within the column, thereby fulfilling the reel acceleration requirements, whereas torque has been limited in order to prevent substantial tape overspeeding.

The graph of FIG. 3 can be equivalently read when tape is being driven in reverse such that the tape loop commences initial upward movement through the column. In this case, plots M, H1 and H2 are valid, depending upon the region where the tape loop is. In such a context, reel damping speeds of −1.1 RPM-0 and −2.1 RPM-0 are assigned for regions H1 and H2, respectively. Thus, if the tape loop passes sensor 42 during steady state running, for example, it is not only known that the loop has passed into region H2, but also that a reel stack diameter of 0.9 full reel (corresponding to a damping speed of 1.1 RPM-0) was attained just previously when the loop was is region H1. Furthermore, if the loop does not return to region M, but rather oscillates about sensor 42, it is known that the stack diameter is less than 0.9 full reel.

At this point, it would be helpful to understand just how the length of the vacuum column is determined in accordance with region and damping speed selection. In this regard, "-Worst-Case-Excursion" is defined as the amount that the tape loop moves in the column when the capstan reverses tape motion while the tape reel is at its maximum velocity and, at the same time, has a maximum moment of inertia. This normally happens when the reel has a full tape stack. Depending, however, upon the ratio of maximum to minimum inertia of the tape reel, worst-case-excursion could also occur with an empty reel. As long as the above ration is about 2.0, the full reel is the worst case.

The distance "S" is hereby defined as the distance the tape moves in the column when the tape reel, with a full tape stack, is accelerated from zero to a peripheral tape stack speed equal to the tape speed past the heads. With the above definitions in mind, the total vacuum column length is merely a combination of excursion lengths obtained for worst-case-excursion and steady run starting at various tape stack sizes.

For example, the system of FIG. 2 with a vacuum column having two sensor pairs and five regions, the total column length needed is the sum of worst-case-excursion for a full reel (4.41S), steady run start excursion beyond the sensors 46 or 44 for a full reel (0.99S), and steady run start excursion for a preaccelerated empty reel (0.4S). The total required vacuum column length is, therefore, 5.80S. Thus, it is easy to see that the length of the vacuum column is a direct function of the ratio of maximum to minimum inertia of the tape reels. If the ratio is increased, the required vacuum column length is decreased.

Figure 4:
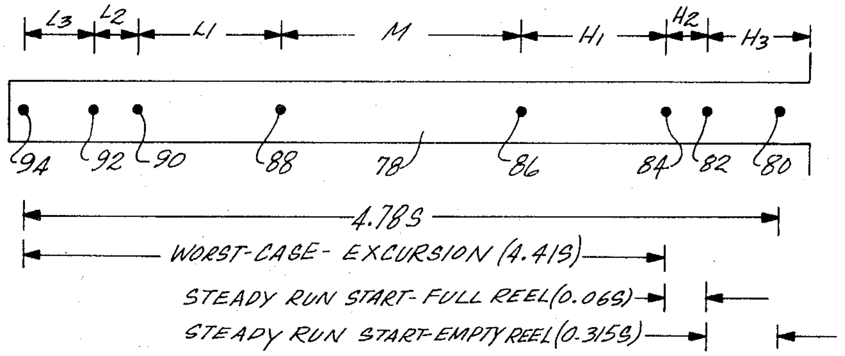
FIG. 4 is a diagrammatic representation of various operative loop positions in a vacuum column having 7 regions and employing the overspeed, torque limiting principles according to the present invention.

An alternatively designed vacuum column 78 having seven regions is shown in FIG. 4 with eight sensors 80, 82, 84, 86, 88, 90, 92 and 94. Actually the system is defined as having three sensor pairs since sensors 80 and 94 do not control the current to the servo operational amplifier but rather act as fail-safe detectors, as is the case with sensors 40 and 50 in FIG. 2. Region M is defined between sensors 86 and 88, region L1 between sensors 88 and 90, region L2 between sensors 90 and 92, region L3 between sensors 92 and 94, region H1 between sensors 84 and 86, region H2 between sensors 82 and 84, and region H3 between sensors 80 and 82. With such a column, an appropriate servo control circuit, analogous to that of FIG. 2 for the five-region column therein shown, can be designed. For instance, the following damping speeds are preferred for each of the seven regions of column 78 and can be maintained by appropriate resistor selection (such as that of resistors R1–R5 in FIG. 2): regions L1 and H1—0.75 RPM-0; regions L2 and H2—1.1 RPM-0; and regions L3 and H3—2.1 RPM-0.

The total length of column 78 is 4.78S (with a reel inertia ratio of 2.5). If the inertia ratio is increased, the required length reduces further. The length 4.78S, is computed by adding the worst-case-excursion length of 4.41S to the sum of the steady run start excursion lengths with full (0.06S) and empty (0.31S) reels, the latter two values considering preacceleration.

The system of FIG. 4 is more efficient than that of FIGS. 1–3 in the sense that the required reel-driving torque is less if the same size buffer is used. This is so since more sensors are used, thereby defining more column regions. In such context, the driving torque may be reduced for each region thereby reducing the overall driving torque required to meet the reel acceleration requirements. It should be obvious that the more sensors, regions and damping speeds for each region are employed, the lower the required driving torque. It is within the contemplation of this invention that any number of sensors and regions, with any desired preselected damping speeds, may be used depending upon such factors as cost, marketability, etc.

In comparing the systems of FIGS. 1–3 and 4 with the prior art systems heretofore described, an ideal tape-driven tachometer servo system (no tape slippage) is defined as a reference (required accelerating torque, T = 100 percent) with a required vacuum column length of 5.0S. With this the case, the systems are compared relative to their required accelerating torque as follows: Prior art (tape-driven tachometer with 10 percent overspeed), T = 108.2 percent; FIGS. 1–3 (two sensor pairs and five regions), T = 116.0 percent; FIG. 4 (three sensor pairs, seven regions with an increased reel inertia ratio), T = 92.0 percent. It should be noted that a non-overspeed limited system has a required accelerating torque of 200 percent relative to the ideal tape-driven tachometer overspeed limit system above defined.

The above results show that the overspeed limit system according to the present invention can replace a tape-driven tachometer and, depending upon the complexity of the system, approach or slightly exceed the performance of an ideal tape-driven tachometer system.

There are numerous other alternatives to the servo control systems of FIGS. 1–3, other than adding additional sensors and vacuum column regions, as in the alternative embodiment of FIG. 4. For instance, the stability of the system can be increased, as well as the system response optimized, by inserting a low-pass filter having an adjustable cutoff frequency into the tachometer feedback loop of the circuit of FIG. 2. Correspondingly, the gain of operational amplifier 70 is FIG. 2 can be made adjustable to compensate for the added filter in the tachometer feedback loop. These changes are well within the knowledge of one skilled in the art.

In further refinement of the embodiment of FIGS. 1–3, as well as FIG. 4, the spacing between the sensors and the damping speeds can be carefully selected so as to balance out the effects of "torque asymmetry." "Torque asymmetry" can be explained with reference to the vacuum force pulling the tape down into column 24 (FIG. 2), for example. If the capstan is driving tape forwardly and thus filling column 24, when sensor 46 is passed reel 14 is accelerated thereby decreasing the rate at which column 24 is filled. In this situation, the vacuum force is opposing the torque induced force tending to empty the column. If the capstan is driving tape in reverse and thus emptying column 24, when sensor 44 is passed the reel is accelerated in reverse thereby decreasing the rate at which the column is emptied. In this context, both the vacuum force and the torque-induced force tend to fill the column and are thus additive in nature. In other words, more torque is needed to accelerate the takeup reel in forward tape drive than in reverse tape drive since, in the former, the opposing vacuum force must be taken into consideration, and in the latter, the adding vacuum force must be considered. The system can be said to be asymmetrical, therefore. By properly spacing the sensors and properly choosing damping speeds for each region, such asymmetry can be effectively accounted for in the design.

Figure 5:
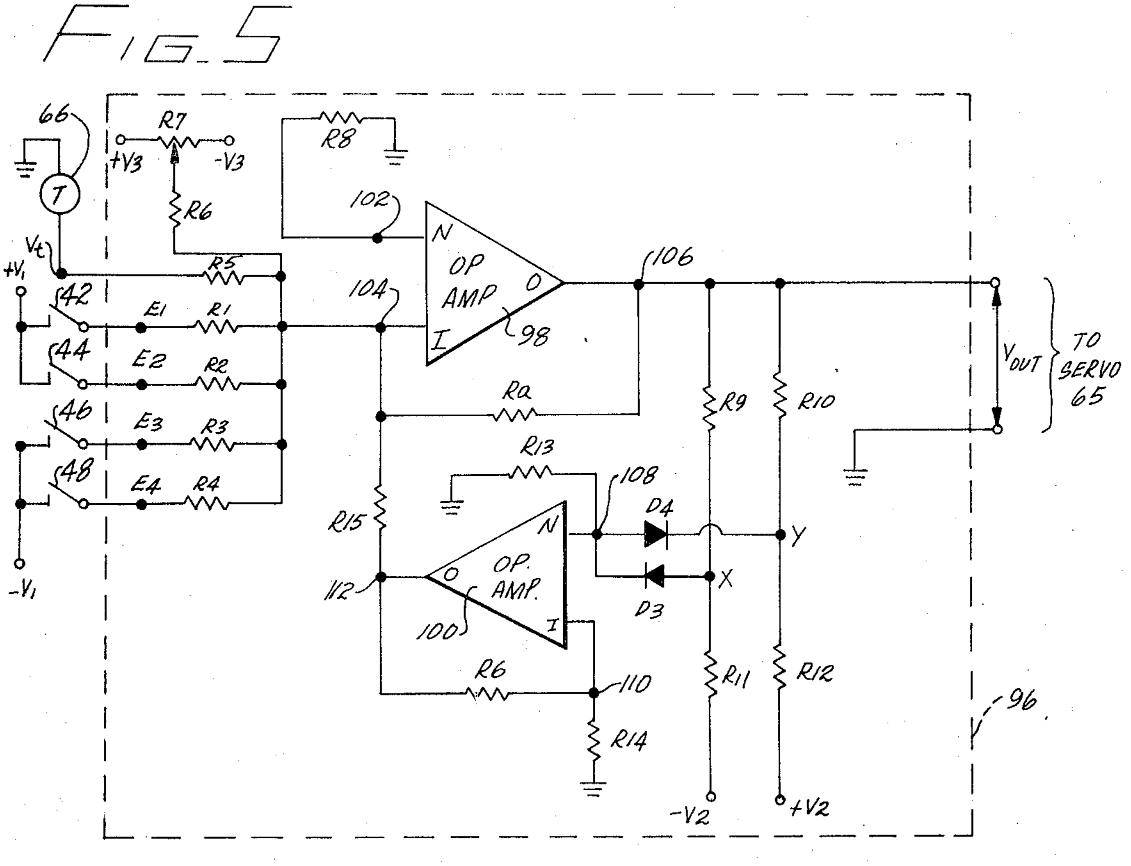
FIG. 5 is an alternative servo control circuit to the one shown in FIG. 3.

A further modification of the system of FIGS. 1–3 involves the replacement of reel servo amplifier circuitry 64, containing clamp 76, by a back-to-back amplifier circuit 96, as shown in FIG. 5. As therein shown, amplifier circuit 96 has a pair of back-to-back operational amplifiers 98 and 100. Amplifier 98 has its noninverting input 102 grounded through a resistor R8 and its inverting input 104 coupled to one end of each of resistors R1, R2, R3, R4 and R5. Thus amplifier 98 is substantially identical in design, purpose and function to amplifier 70 of FIG. 2. In other words, the signal at its inverting input 104 is greatest just after a sensor is past, since $Vt/R5 = 0$, and is zero once the damping speed for the associated region has been reached, since $Vt/R5 = (E1/R1) + (E2/R2) + (E3/R3) + (E4/R4)$. E1, E2, E3 and E4 represent the voltage levels at the respective other ends of resistors R1–R4, such other ends being respectively coupled to sensor switches 42, 44, 46 and 48.

The output for circuitry 96, Vout, is defined between output 106 of amplifier 98 and ground. Vout is set to zero, when the circuit is not operated, by adjusting a potentiometer R7 having one end at +V3 potential, its other end at −V3 potential, and its adjustable center tap coupled to inverting input 104 of amplifier 98 through a resistor R6. Output 106 of amplifier 98 is, in turn, fed back to inverting input 104 through a feedback resistor Ra. Additionally, output 106 is coupled to the anode of diode $D_3$ at point X through a resistor R9, and is further coupled to the cathode of diode D4 at point Y through a resistor R10. A source of negative bias voltage, −V2, is coupled to point X through a resistor R11, and a source of positive bias voltage, +V2, is coupled to point Y through a resistor R12. Thus, diodes D3 and D4 are both back-biased.

The anode of diode D4 and the cathode of diode D3 are each coupled to a noninverting input 108 of amplifier 100 which is, in turn, grounded through a resistor R13. An inverting input 110 of amplifier 100 is fed back to its output 112 through a feedback resistor R6, and is grounded through a resistor R14. Output terminal 112 of amplifier 100 is coupled to the inverting input 104 of amplifier 98 through a coupling resistor R15.

The operation of the system of FIG. 5 is explained with regard to back-to-back amplifier circuitry 96, as substituted for amplifier circuitry 64 of FIGS. 1 and 2. Thus, FIGS. 1, 2 and 5 must be simultaneously considered. Assume that capstan 32 starts driving tape in a forward direction thereby filling tape into vacuum column 24 at a constant speed. This, of course, makes the tape loop progress downwardly through region M from an initial position adjacent mid-sensor 45.

When loop sensor 46 is passed, as the pate advances into region L1, switch 46 closes thereby causing a current of −V1/R3 to be supplied to inverting input 104 of amplifier 98. Since reel 14 was previously stationary, the value of Vt/R5 is zero. This causes a maximum output at amplifier output 106 which is supplied to servo 65. The output signal at 106 is limited, or clamped, at a maximum positive value which is established by the values of −V2, R9, R11 and the voltage drop across diode D3. It should be noted that if the capstan were driving the tape in reverse and thereby emptying column 24 once sensor 44 was passed, a maximum negative clamped value of output 106 would be established by the values of +V2, R10,R12 and the voltage drop across diode D4.

Amplifier 98 is thus designed to operate with normal gain as long as its output is within limits defined by the maximum positive and negative clamped values. When the input at terminal 104 is such that the normal amplifier gain would produce an output equaling either maximum clamped value (depending on whether the column is being filled or emptied), further increases in input voltage at input 104 results in an essentially constant output at the maximum clamped value. This is due to a heavy negative feedback from output 106, through the network R9–R12, D3, D4, and amplifier 100, to input 104 of amplifier 98.

Although the circuit of FIG. 5 closely resembles that of FIGS. 1 and 2 in design, purpose and function, it has the major advantage in that none of the solid state elements employed goes into saturation while the voltage at amplifier output 106 remains limited to the range between a maximum positive clamped value and a maximum negative clamped value. Saturation in transistors can cause uncontrollable signal delays because of storage time which may give rise to instability in fast responding servo systems.

There are yet other possible modifications to the systems already described, such modifications being within the scope of the present invention. For instance, diode clamp 76 of circuitry 64 of FIGS. 1 and 2 may be eliminated altogether. In such a context, a maximum positive and negative output from amplifier 70 can be obtained by causing a current proportional feedback loop between output 72 and input 74. Such feedback loops are well known in the art.

Another modification of the circuits of FIGS. 1, 2 and 5 involves using a voltage proportional to the speed of the capstan as the reference potential for amplifier 70 (FIGS. 1 and 2) or amplifier 98 (FIG. 5). For instance, a capstan-driven tachometer could have its output coupled directly to the noninverting inputs of amplifiers 70 or 98, instead of such inputs being grounded. Using other than zero potential as a reference enables the middle region M of the column to be shortened thereby decreasing the overall length of the column.

What has been described overall, therefore, is a method and apparatus for limiting tape overspeeding at the reels by reducing the applied torque thereto. The torque is reduced to a minimum amount still consistent with the acceleration requirements of the reels. The rotational speed of a reel is metered and a first signal indication thereof is provided. The vacuum column associated with the reel is divided into regions of pre-assigned lengths by a plurality of loop position sensors spaced throughout the column, the sensors detecting the passage of the tape loop between adjacent regions. A different value of reel angular velocity as established as a reference for each region with a reference signal indicative of a particular reel angular velocity each time the tape loop enters a different region. The first and reference signals are compared and the applied torque to the reel is cut off in each region whenever the first and reference signals, provided with the tape in that region, reach a predetermined relationship.

This, the invention achieves overspeed limiting by limiting applied torque. This is done using a reel-driven tachometer, but without necessitating the direct sensing of stack diameter since only angular velocities are used in the control operation. It is not necessary to first convert angular reel velocity to linear tape velocity.

What is claimed is:

1. In a magnetic tape transport wherein tape is driven past an electromagnetic head and onto a motor-driven reel and a vacuum column buffers tape between the head and the reel, a method for limiting tape overspeeding at the reel relative to the tape speed past the head by limiting the torque applied to the reel by the motor, the method comprising the steps of:

a. metering the rotational speed of the reel and providing a first signal indicative thereof;

b. dividing the vacuum column into regions of preassigned lengths;

c. providing a second signal which changes in value each time the tape loop passes between a pair of adjacent regions; and d. disabling the motor form applying torque to the reel with the tape in any particular region when the first and second signals provided for that particular region reach a predetermined relationship.

2. The method of claim 1, wherein the disabling step includes adding the second signal to the first signal, the motor being cut off when the first and second signals cancel.

3. The method of claim 1, wherein the disabling step includes providing a third signal indicative of the sum of the first and second signals and cutting off the motor when the third signal is zero.

4. The method of claim 3, wherein the disabling step further includes clamping the third signal between a preselected maximum positive and negative value, the motor thereby producing a maximum positive and negative output reel-driving torque.

5. In a magnetic tape transport wherein tape is driven past an operational zone, through a vacuum column, and onto a motor-driven reel, apparatus for limiting the torque applied to the reel by the motor comprising:

a. means metering the angular velocity of the reel for providing a control signal indicative thereof;
b. means dividing the column into regions of preassigned lengths for detecting passing of the loop between adjacent regions;
c. means responsive to the detecting means for providing a reference signal indicative of the particular region in which the tape loop is positioned;
d. means adding the control signal and reference signal; and
e. means responsive to the output of the adding means for cutting off the applied torque to the reel by the motor whenever the control signal and reference signal reach a predetermined relationship.

6. In a magnetic tape transport wherein tape is driven past an electromagnetic head and onto a motor-driven reel and a vacuum column buffers tape between the head and the reel, apparatus for limiting tape overspeed at the reel relative to the tape speed past the head by limiting the torque applied to the reel by the motor, the apparatus comprising:

a. first means metering the rotational speed of the reel for providing a first signal indicative thereof;
b. second means dividing the vacuum column into regions of preassigned lengths for sensing when the tape passes between regions;
c. third means for providing a distinct second signal of preassigned value for each regional position of the tape loop; and
d. fourth means responsive to the first and second signals for disabling the motor from applying torque to the reel whenever the first and second signals provided in that particular region reach a predetermined relationship.

7. The apparatus of claim 6 wherein the first means includes a reel-driven tachometer.

8. The apparatus of claim 6, wherein the second means includes a plurality of loop position sensors spacially disposed throughout the vacuum column, the regions being defined therebetween.

9. The apparatus of claim 6, wherein the fourth means includes means for adding the first and second signals and for cutting off the motor when the first and second signals cancel.

10. The apparatus of claim 6, wherein the fourth means includes means for providing a third signal indicative of the sum of the first and second signals, the motor being cut off when the third signal is zero.

11. The apparatus of claim 10, wherein the third means further includes means for clamping the third signal between preselected maximum positive and negative values, the motor thereby producing a maximum positive and negative output reel-driving torque.

12. In a magnetic tape transport wherein tape is driven past an operational zone and onto a motor-driven reel and a vacuum column buffers tape between the head and the reel, apparatus for limiting tape overspeeding at the reel relative to the tape speed past the zone by limiting the torque applied to the reel by the motor, the apparatus comprising:

a. a plurality of loop position sensors spacially disposed throughout the column and defining a plurality of regions therebetween;
b. means coupled to the loop position sensors for establishing a first signal which changes between two preassigned values each time the tape passes a distinct one of the sensors;
c. a reel-driven tachometer for generating a second signal indicative of the rotational speed of the reel;
d. means adding the first and second signals for generating a third signal indicative of their sum;
e. amplifier means responsive to the third signal for generating a reel drive motor control signal; and
f. clamp means coupled to the amplifier means for limiting the maximum positive and negative values of the control signal thereby limiting the maximum positive and negative reel-driving torque.

13. The apparatus of claim 12, wherein the amplifier means has an input terminal coupled to the adding means and an output terminal coupled to the motor through the clamp means.

14. The apparatus of claim 13, further comprising a reel servo control circuit coupled between the clamp means and the motor and responsive to the control signal for controlling the torque generated by the motor.

15. The apparatus of claim 13, wherein the amplifier means includes an operational amplifier having a feedback path between its output and input, the clamp means being included in the feedback path.

16. The apparatus of claim 13, wherein the clamp means comprises:

a. a diode clamp coupled to the output of the amplifier means; and
b. an operational amplifier having an input coupled to the diode clamp and an output coupled to the input of the amplifier means.

* * * * *

PO-1050
(5/69)

UNITED STATES PATENT OFFICE
CERTIFICATE OF CORRECTION

Patent No. 3,648,950 Dated March 14, 1972

Inventor(s) Sebastian Eric Grabl

It is certified that error appears in the above-identified patent and that said Letters Patent are hereby corrected as shown below:

Column 5, Line 71- "of" should read --or--.

Column 6, Line 22- For "minimum" substitute --maximum -;

Line 28- "+V2" should read --$\pm$V2--.

Column 7, Line 42- "(R+R4)" should read --(R3+R4)--;

Line 59- "in not" should read --is not--.

Column 8, Line 11- "+(R1·R2)" should read --+V1(R1·R2)--;
16- "(Rbq.R2) should read --R1·R2)--.

Column 9, Line 9- "that" should read --than--;

Line 26- "is" should read --in--;

Line 40- "ration" should read --ratio--.

Column 10, Line 52- "is" should read --in--.

Column 11, Line 17- "Vt/R5 =" should read --|Vt/R5| = | --;

Line 17- "($^{E4}$/R4)" should read -- "($^{E4}$/R4)| --;

Line 52- "pate" should read --tape--.

Column 12, Line 45- "This" should read --Thus--;

Line 65- "form" should read --from--.

Signed and sealed this 26th day of September 1972.

(SEAL)
Attest:

EDWARD M.FLETCHER,JR.
Attesting Officer

ROBERT GOTTSCHALK
Commissioner of Patents